Jan. 9, 1951  J. K. NORTHROP  2,537,368
ARTIFICIAL ARM HOOK
Filed Sept. 9, 1947  2 Sheets-Sheet 1
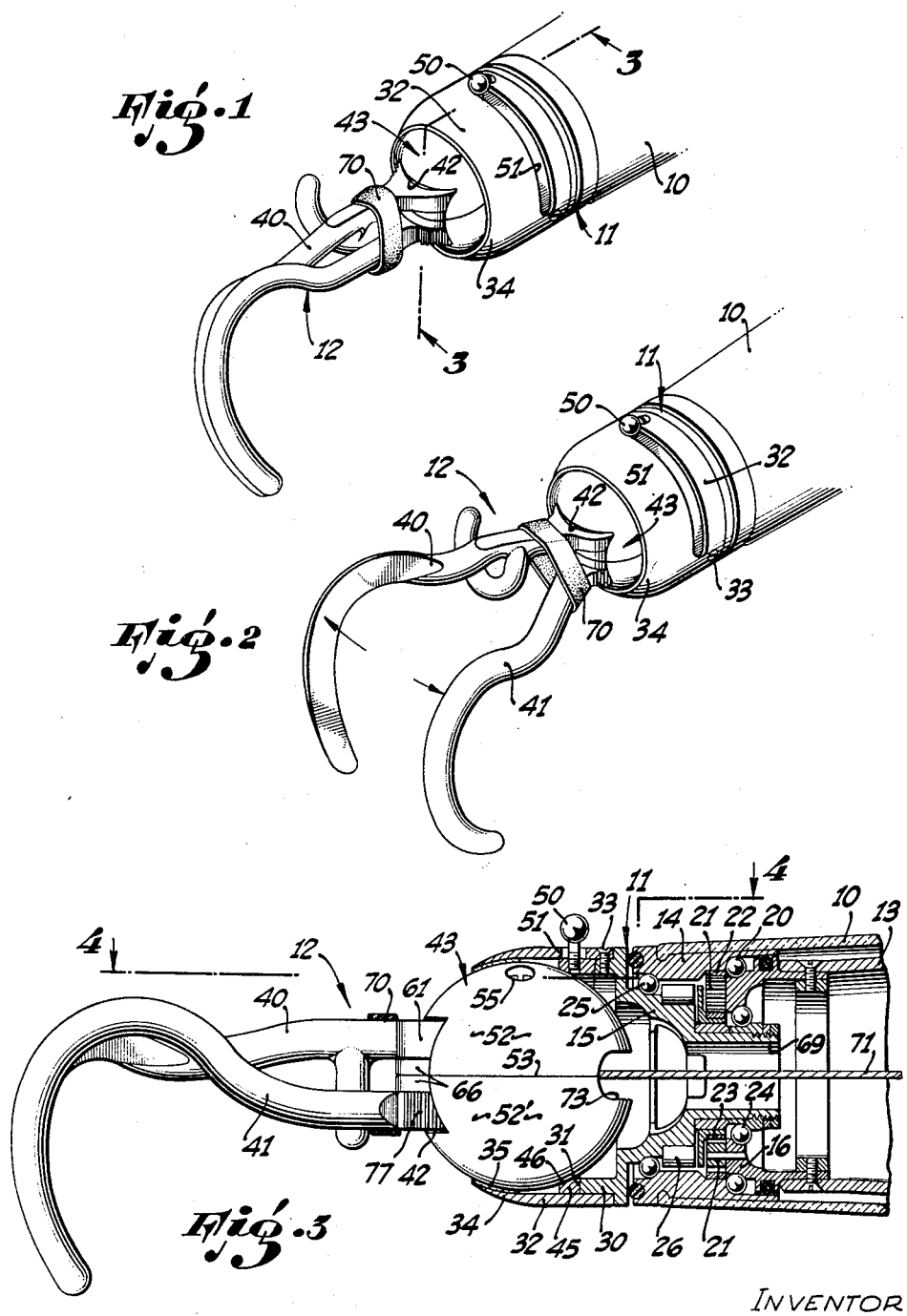
INVENTOR.
John K. Northrop,
BY
ATTORNEY.

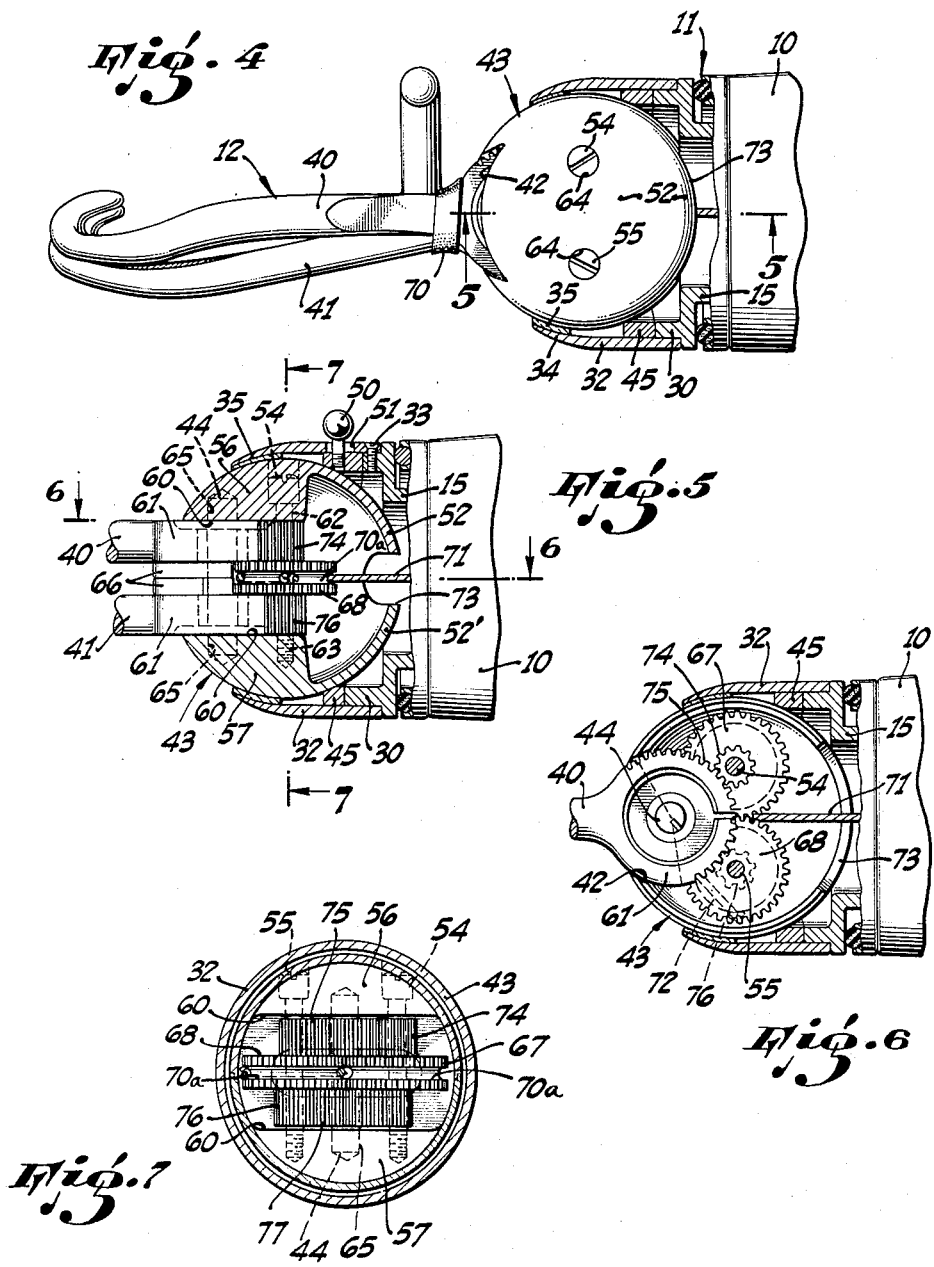

Patented Jan. 9, 1951

2,537,368

UNITED STATES PATENT OFFICE 2,537,368

ARTIFICIAL ARM HOOK

John K. Northrop, Los Angeles, Calif., assignor to Northrop Aircraft, Inc., Hawthorne, Calif., a corporation of California Application September 9, 1947, Serial No. 773,024

11 Claims. (Cl. 3—12)

The present invention relates to artificial arm hooks, and the primary object of the invention is to provide a new and improved hook which is mounted for rotation about the pronation-supination axis thereof, and which can be turned on the said axis without adverse effect on the opening and closing operation of the hook.

In all prior hooks with which I am familiar, the hook is opened and closed by means of an external, outwardly projecting operating lever, the outer end of which is connected to the control wire of a Bowden cable, or to a rawhide thong. When such a hook is turned on its pronation-supination axis, the point of attachment of the control wire to the operating lever shifts toward or away from the point of anchorage of the cable housing to the forearm component of the artificial arm, causing the wire to slacken or tighten, as the case may be. The control wire is attached at its upper end to a harness worn on the opposite shoulder of the amputee, and the wire is pulled by a forward shrug of the shoulder, to operate the hook. If there is slack in the wire, such slack must be taken up by the initial movement of the harnessed shoulder before the hook can be opened, leaving a reduced amount of control movement available for operating the hook. Conversely, if the control wire is tightened by rotation of the hook, it becomes necessary to pull the harnessed shoulder back from its normal relaxed position in order to close the hook. Both slack and excessive tension in the control wire are therefore undesirable, and it is an object of the invention to produce a hook which is constructed and arranged so that tension in the control wire is unaffected by rotation of the hook on its pronation-supination axis.

Another object of the invention is to provide a hook which is mounted for universal angular movement, and which can be secured at any angle to the forearm axis within the limits of its angular movement. In this same connection, a further object of the invention is to provide locking means for securing the hook in angularly adjusted position, which is operable by a single control member movable along a linear path between locked and unlocked positions, and which can be operated easily and conveniently by another hook, as in the case of a bilateral amputee.

Still another object of the invention is to provide a hook which is adjustable angularly in all directions about a fixed point, and in which the force-transmitting control member for operating the hook passes through said point, so that the operation of the hook is unaffected by its angular position.

A further object of the invention is to provide a hook having two cooperating hook members both of which are pivoted and operatively connected together to move simultaneously in opposite directions, so that the said hook members can be spread apart to a greater useful width than is obtainable with prior hooks having only one of the hook members movable and the other stationary. Another advantage of this arrangement is that the amount of hook opening obtained from a given distance of control wire travel is double that obtained with prior hooks, and therefore the amount of muscular movement of the harnessed shoulder required to open the hook to a specified width is reduced by one-half.

The foregoing and other objects and advantages of the present invention will become apparent to those skilled in the art upon consideration of the following detailed description of the preferred embodiment thereof, reference being had to the accompanying drawings, in which:

Figure 1 is a perspective view of a hook embodying the principles of the invention;

Figure 2 is another view of the same, showing the hook in the open position;

Figure 3 is an enlarged sectional view, taken along the line 3—3 in Figure 1;

Figure 4 is a sectional view taken along the line 4—4 in Figure 3;

Figure 5 is a sectional view taken at 5—5 in Figure 4;

Figure 6 is a sectional view taken along the line 6—6 in Figure 5; and

Figure 7 is a sectional view taken along the line 7—7 in Figure 5.

In the drawings, the reference numeral 10 designates the outer forearm shell of an artificial arm, and mounted on the outer end thereof is a wrist unit 11 and hook 12. The artificial arm, in this instance, is of the type used in below-elbow amputations, and the wrist unit 11 is harnessed to the forearm stump to utilize the rotation thereof in turning the hook 12 on its pronation-supination axis. In this type of prosthesis, the forearm shell 10 is connected to a sleeve or cuff on the upper arm by means of an elbow hinge (not shown) and rotatably disposed within the shell 10 is a stump socket 13 which is fitted onto the end of the stump and is operatively connected to the wrist unit 11.

The wrist unit 11 is shown and described in the Northrop and Nagy Patent 2,457,316 for Prosthetic Wrist, to which reference is had for details of the structure and mode of operation. Briefly, the unit 11 includes an annular housing 14 which is embedded in and bonded to the shell 10, and rotatably disposed within the housing 14 concentric therewith are driven member 15 and pinion carrier 16. The pinion carrier 16 is connected to the outer end of the stump socket 13 and is journalled on ball bearings 20 which run on races formed on the inside of the housing 14. Pinions 21 are journalled on the front end of the carrier 16 and mesh with a ring gear 22 fixed to the inner surface of the stationary housing 14, and with a sun gear 23 fixed to the hub of the driven member 15. The driven member 15 runs on ball bearings 24 and 25, and is driven at a stepped-up ratio by the planet gears 21. Locking rollers 26 are disposed between opposed surfaces on the driven member 15 and housing 14, and operate to lock the driven member 15 against rotation by external forces applied to the hook 12, while permitting free rotation of the driven member by a driving force applied to the pinion carrier 16 through the stump socket 13.

Projecting from the outer end of the driven member 15 concentric with the axis of rotation thereof is an annular flange 30 which is cut off at an angle so as to form an inclined cam surface 31. The rear end of the housing 32 is telescopically inserted over the flange 30 and is secured thereto by screws 33. The housing 32 is a generally cylindrical sleeve, and is formed with a spherically curved taper 34 at the front end thereof, the inside surface of the tapered portion 34 being faced at 35 with any suitable frictional material such as cork, rubber, or the like.

The hook 12 comprises two cooperating hook members 40 and 41, the rear ends of which overlap and extend through an opening 42 in a ball 43, and are pivotally connected thereto by a pivot pin 44. The ball 43 seats on the frictional facing 35 in the front of the housing 32, and is clamped tightly against the same by locking means consisting of a wedge-shaped clamping ring 45 which is rotatable within the housing 32, and bears against the cam surface 31 on the end of the flange 30. The inner surface of the clamping ring 45 is formed with a spherical seat portion 46 that engages the back side of the ball 43, and the ring, together with the spherically curved front end portion 34 of the housing, form a socket in which the ball 43 is contained. When the ring 45 is turned within the housing, the wide portion of the ring rides up onto the high side of the cam surface 31, causing the spherical seat portion 46 to move toward the ball 43, clamping the latter tightly against the frictional facing 35 to lock the ball in adjusted position. The ring 45 is turned by means of a knob 50 which is screw-threaded into the ring and extends outwardly therefrom through a circumferential slot 51 in the side wall of the housing 32.

Ball 43 is hollow, and is preferably made in two halves 52 and 52', which are joined along a diametral plane 53 and secured together by two fillister head screws 54 and 55. Shoulders 56 and 57 are formed on the insides of the two halves 52, 52', respectively, adjacent the opening 42, providing parallel flat surfaces 60, against which the outside faces of the hubs 61 of hook members 40 and 41 bear. The screws 54, 55 extend through smooth holes 62 in the top half-shell 52 and are threaded into tapped holes 63 in the shoulder 57 of the bottom half-shell 52'. The heads of the screws 54, 55 are seated down in counterbores 64 in the top half-shell 52, and are disposed entirely below the outer surface of the ball.

The pivot pin 44 extends through axially alined holes in the centers of the hubs 61, which are circular in planform, and the opposite ends of the pin are received within socket holes 65 in the shoulders 56 and 57. Arcuate spacers 66 are provided on the adjacent surfaces of the hubs 61, which space the said surfaces apart, as shown, to receive gears 67 and 68 between them. The hook members 40 and 41 are drawn together to the closed position by a rubber band 70 which encircles the root ends of the hooks just outwardly of the hub portions 61, and the said members are spread apart against the tension of the rubber band by means which will now be described.

The two gears 67 and 68 are arranged side by side within the space between the hubs 61, and are in mesh with one another. Gear 67 is journalled on the smooth shank of screw 54, while gear 68 is journalled on screw 55. Annular channels 70a of semi-circular section are cut into the toothed peripheries of the gears 67, 68 midway between the sides thereof to form a pulley track for a flexible control wire or cord 71. The wire 71 is laid in the channel of gear 68 and extends around the latter for a portion of its circumference. The wire 71 is attached to the gear 68 in any suitable manner, such as by passing the end thereof through a hole 72 drilled through the gear along a chord line (Figure 6) and providing a knot or other enlargement on the projecting end of the wire so that said end is prevented from pulling through the hole. The point of tangency of the gears 67, 68 is at the center of the ball 43, which is also located on the axis of rotation of the wrist unit driven member 15. The control wire 71 passes rearwardly from the point of tangency of gears 67, 68 throught an elongated opening 73 in the back of ball 43, and thence through the hollow center 69 of the wrist unit driven member 15, into the stump socket 13. Suitable openings (not shown) are provided in the upper end portions of the stump socket 13 and forearm shell 10, and the wire 71 passes outwardly through these openings and up the arm to a point of attachment with the usual shoulder harness.

Projecting upwardly from the gear 67 and coaxial therewith is a pinion 74 which meshes with teeth 75 formed on the periphery of the circular hub 61 of hook member 40. Another pinion 76 projects downwardly from gear 68, and meshes with teeth 77 formed on the periphery of the hub 61 of hook member 41.

When the control wire 71 is pulled by a forward shrug of the harnessed shoulder, gear 68 is turned in a clock-wise direction, driving gear 67 in a counterclockwise direction. Thus, it will be seen that the hook members 40 and 41 are rotated simultaneously in opposite directions to open the hook. Since the point to which the pull of control wire 71 is applied is at the center of the ball 43, the control of the hook is unaffected by the angular position of the axis of the hook with respect to the axis of the forearm. In like manner, since the control wire 71 lies on the axis of rotation of the wrist unit driven member 15, rotation of the hook on its pronation-supination axis has no effect upon the operation of the hook member.

The hook 12 is readily positioned at any desired angle by merely pulling the knob 50 in toward the center of the slot 51, which causes the locking ring 45 to rotate on the cam surface 31 and back away from the ball 43. This loosens the ball in its socket, and the hook 12 can then be moved to the desired position and re-locked by pushing the knob 50 back to the end of slot 51.

While I have shown and described in considerable detail what I believe to be the preferred form of my invention, it is to be understood that such details are not restrictive, and that various changes may be made in the shape and arrangement of the several parts without departing from the scope of the invention as defined in the appended claims.

I claim:
1. An artificial arm hook comprising a pair of hook members pivotally supported for swinging movement about a common axis, a pair of intermeshed gears, a pinion on one of said gears meshing with teeth on one of said hook members, another pinion on the other of said gears meshing with teeth on the other of said hook members, and control means operatively connected to one of said gears for driving said intermeshed gears and associated pinions, whereby said hook members are swung simultaneously in opposite directions.

2. An artificial arm hook comprising a housing having a spherical socket formed therein, a hollow ball adjustably mounted in said socket, a pair of cooperating hook members pivoted on said ball for swinging movement toward and away from one another, a pair of intermeshed gears disposed within said ball, the point of tangency of said gears being at the center of said ball, means connecting each of said gears with one of said hook members, whereby said hook members are caused to swing simultaneously in opposite directions when said gears are rotated, and control means connected to one of said gears to apply a turning force thereto at said point of tangency, whereby said ball and associated hook members can be adjusted to any angle in said socket without affecting the operation of said hook members.

3. An artificial arm hook comprising a housing having a spherical socket formed therein, a hollow ball adjustably mounted in said socket, a pair of cooperating hook members pivoted on said ball for swinging movement toward and away from one another, a pair of intermeshed gears disposed within said ball, the point of tangency of said gears being at the center of said ball, a pinion on one of said gears meshing with teeth on one of said hook members, another pinion on the other of said gears meshing with teeth on the other of said hook members, said gears having circumferential channels formed in the toothed peripheries thereof, and a control wire extending into said ball through an opening in the back side thereof to said point of tangency of said gears, said wire being laid in the channel of one of said gears and extending part way around its circumference to a point of attachment therewith, whereby said ball and associated hook members can be adjusted to any angle in said socket without affecting the operation of said hook member.

4. An artificial arm hook comprising a housing having a spherically curved seat at one end thereof, a ball disposed within said housing and bearing at one side against said seat, a pair of cooperating hook members mounted on said ball, an axially movable and rotatable locking ring disposed within said housing at the other end thereof and bearing against the other side of said ball, and cam means cooperating with said ring, when the latter is turned, to move the ring axially into clamping engagement with said ball.

5. An artificial arm hook comprising a housing having a spherically curved seat at one end thereof, a ball disposed within said housing and bearing at one side against said seat, a pair of cooperating hook members mounted on said ball, an annular cam surface disposed within said housing at the other end thereof, an axially movable and rotatable locking ring within said housing and bearing at one end against said cam surface and at the other end against said ball, said cam surface cooperating with said ring, when the latter is turned, to move the ring axially into clamping engagement with said ball, and an operating knob on said ring projecting through a circumferential slot in said housing, whereby said ball can be clamped in adjusted position by movement of said operating knob along the length of said slot.

6. A utility hook for use with an artificial arm, said hook comprising a housing having means forming a spherical socket therein, a hollow ball disposed within said socket, a pair of cooperating hook members mounted on said ball, at least one of said members being movable toward and away from the other members, a rotatable member journaled within said ball for rotation about an axis generally perpendicular to the longitudinal axis of said arm, the perimeter of said rotatable member passing through the center of said ball, said rotatable member being operatively connected to said one hook member to move the same, and control means connected to said rotatable member along the perimeter thereof and extending rearwardly therefrom at the center of said ball along the longitudinal axis of said arm, whereby said ball and associated hook members can be adjusted angularly in said socket without affecting the operation of said one hook member.

7. A utility hook for use with an artificial arm, said hook comprising a housing having means forming a spherical socket therein, a hollow ball disposed within said socket, a pair of cooperating hook members mounted on said ball, at least one of said members being movable toward and away from the other member, a pulley wheel journaled within said ball for rotation about an axis spaced laterally from and generally perpendicular to the longitudinal axis of said arm, the perimeter of said pulley wheel being tangent to said longitudinal axis of said arm at the center of said ball, said pulley wheel being operatively connected to said one hook member to move the same, and a control cord connected to said pulley wheel and extending rearwardly from the perimeter thereof at the center of said ball along the longitudinal axis of said arm, whereby said ball and associated hook members can be adjusted angularly in said socket without affecting the operation of said one hook member.

8. An artificial arm hook comprising a pair of cooperating hook members pivotally supported for swinging movement toward and away from one another, a pair of intermeshed gears journaled for rotation about laterally spaced axes, each of said gears being operatively connected to one of said hook members, whereby the latter are caused to swing simultaneously in opposite directions, and control means operatively connected to one of said gears for driving said intermeshed gears.

9. A utility hook for use with an artificial arm, said hook comprising a housing having means forming a spherical socket therein, a hollow ball disposed within said socket, a pair of cooperating hook members pivotally supported on said ball for swinging movement toward and away from one another, a pair of intermeshed gears journaled within said ball for rotation about axes disposed on opposite sides of the longitudinal axis of said arm and generally perpendicular thereto, each of said gears being operatively connected to one of said hook members, whereby the latter are caused to move simultaneously in opposite directions, the perimeter of one of said gears passing through the center of said ball, and control means connected to said one gear along the perimeter thereof and extending rearwardly therefrom at the center of said ball along the longitudinal axis of said arm, whereby said ball and associated hook members can be adjusted angularly in said socket without affecting the operation of said one hook member.

10. An artificial hand of the class described comprising cooperating hooks movable relatively toward and from each other, a forearm shell, opposed inner and outer cooperating substantially concentric surfaces of revolution disposed for relative rotary movement in a plurality of directions at substantially right angles to each other and extending transversely of the forearm shell for supporting said hooks for bodily movement about the common center of said surfaces of revolution, means continuously operable substantially at said common center of said surfaces of revolution for operating said hooks relatively toward and from each other and for maintaining the position of said hooks relative to each other independently of relative movement of said surfaces of revolution and thereby providing for relative movement of said hooks toward and from each other entirely independent of and unaffected by relative movement of said surfaces of revolution, means for supporting one of said surfaces of revolution from said forearm shell, and means for supporting said hooks for relative movement toward and from each other on the other of said surfaces of revolution.

11. An artificial hand of the class described comprising cooperating hooks movable relatively toward and from each other, a forearm shell, opposed inner and outer substantially concentric spherical surfaces cooperatively associated for relative substantially universal movement for supporting said hooks for bodily movement substantially about the common center of said spherical surfaces, operating means disposed substantially within said spherical surfaces and responsive continuously only to force applied thereto substantially at the common center of said spherical surfaces for effecting movement of said hooks relatively toward and from each other, means for supporting one of said spherical surfaces from the forearm shell, and means for supporting the hooks from the other of said spherical surfaces.

JOHN K. NORTHROP.

REFERENCES CITED

The following references are of record in the file of this patent:

UNITED STATES PATENTS

| Number | Name | Date |
|---|---|---|
| 1,193,969 | Aunger | Aug. 8, 1916 |
| 1,380,664 | Luke | June 7, 1921 |
| 1,417,267 | McElroy | May 23, 1922 |
| 1,475,119 | Hulsmann | Nov. 20, 1923 |
| 1,725,588 | Kosek | Aug. 20, 1929 |
| 2,347,909 | Jarrett | May 2, 1944 |

FOREIGN PATENTS

| Number | Country | Date |
|---|---|---|
| 103,481 | Great Britain | July 19, 1917 |

OTHER REFERENCES

"Terminal Research Reports on Artificial Limbs" by Committee on Artificial Limbs, National Research Council, page 26. (A copy was received in Div. 55 of the Patent Office Nov. 13, 1947.)